(12) United States Patent
Fujiwara

(10) Patent No.: US 10,551,054 B2
(45) Date of Patent: Feb. 4, 2020

(54) STEAM USING FACILITY MANAGEMENT METHOD, AND STEAM USING FACILITY

(71) Applicant: TLV Co., Ltd., Kakogawa-shi (JP)

(72) Inventor: Yoshiyasu Fujiwara, Kakogawa (JP)

(73) Assignee: TLV Co., Ltd., Hyogo (JP)

(*) Notice: Subject to any disclaimer, the term of this patent is extended or adjusted under 35 U.S.C. 154(b) by 371 days.

(21) Appl. No.: 15/501,638

(22) PCT Filed: Jul. 17, 2015

(86) PCT No.: PCT/JP2015/070574
§ 371 (c)(1),
(2) Date: Feb. 3, 2017

(87) PCT Pub. No.: WO2016/021396
PCT Pub. Date: Feb. 11, 2016

(65) Prior Publication Data
US 2017/0227213 A1 Aug. 10, 2017

(30) Foreign Application Priority Data

Aug. 4, 2014 (JP) .................. 2014-158753

(51) Int. Cl.
| | |
|---|---|
| *F16T 1/48* | (2006.01) |
| *F22B 37/42* | (2006.01) |
| *F22D 5/00* | (2006.01) |
| *H04L 12/26* | (2006.01) |
| *H04L 12/18* | (2006.01) |
| *H04L 12/801* | (2013.01) |

(52) U.S. Cl.
CPC ............ *F22B 37/42* (2013.01); *F16T 1/48* (2013.01); *F22D 5/00* (2013.01); *H04L 12/1895* (2013.01); *H04L 43/08* (2013.01); *H04L 47/10* (2013.01)

(58) Field of Classification Search
None
See application file for complete search history.

(56) References Cited

U.S. PATENT DOCUMENTS

| | | | |
|---|---|---|---|
| 3,916,936 A | 11/1975 | Villaume et al. | |
| 4,705,212 A * | 11/1987 | Miller ................ | F16T 1/00 |
| | | | 137/171 |
| 4,788,849 A | 12/1988 | Yonemura et al. | |
| 5,408,715 A * | 4/1995 | Keller ................ | D06B 23/24 |
| | | | 68/5 D |

(Continued)

FOREIGN PATENT DOCUMENTS

| | | |
|---|---|---|
| EP | 0905601 A1 | 3/1999 |
| JP | 60243401 A | 12/1985 |

(Continued)

*Primary Examiner* — Kibrom K Gebresilassie
(74) *Attorney, Agent, or Firm* — The Webb Law Firm

(57) ABSTRACT

A steam using facility in which a generated condensate amount changes in association with a change in an environmental state value, based on a correlation between the environmental state value and the generated condensate amount. An environmental state value when the generated condensate amount becomes a set alarm amount is set as an alarm state value. An alarm is issued when an actual environmental state value by a measuring instrument changes in an increasing direction of the generated condensate amount to reach the set alarm state value.

10 Claims, 1 Drawing Sheet

(56) References Cited

U.S. PATENT DOCUMENTS

| | | | |
|---|---|---|---|
| 6,556,894 B1 | 4/2003 | Nguyen | |
| 7,005,866 B2* | 2/2006 | Schroeder | F22B 37/025 |
| | | | 165/11.1 |
| 7,940,189 B2* | 5/2011 | Brown | F16K 37/0075 |
| | | | 340/605 |
| 8,739,808 B2* | 6/2014 | Aloni | F16T 1/48 |
| | | | 137/14 |
| 9,207,670 B2* | 12/2015 | Rud | G05B 23/0221 |
| 10,301,974 B2* | 5/2019 | Yoshida | F01K 7/165 |
| 2006/0168013 A1* | 7/2006 | Wilson | G05B 19/4184 |
| | | | 709/206 |
| 2009/0043406 A1* | 2/2009 | Gauder | C02F 1/008 |
| | | | 700/30 |
| 2009/0312930 A1* | 12/2009 | Nakakita | F01D 17/08 |
| | | | 701/100 |
| 2011/0060567 A1 | 3/2011 | Fujiwara | |
| 2012/0010758 A1* | 1/2012 | Francino | G05B 17/02 |
| | | | 700/291 |
| 2013/0118614 A1* | 5/2013 | Mcfeeters | G01K 1/16 |
| | | | 137/551 |
| 2014/0058534 A1* | 2/2014 | Tiwari | G05B 13/04 |
| | | | 700/9 |
| 2014/0250890 A1* | 9/2014 | Takahashi | F01K 7/16 |
| | | | 60/670 |
| 2015/0049851 A1* | 2/2015 | Yokoyama | G21D 3/001 |
| | | | 376/217 |
| 2017/0153023 A1* | 6/2017 | Fujiwara | F01K 13/003 |

FOREIGN PATENT DOCUMENTS

| | | |
|---|---|---|
| JP | 10307625 A | 11/1998 |
| JP | 2001175972 A | 6/2001 |
| JP | 2001323806 A | 11/2001 |
| JP | 2005273655 A | 10/2005 |
| JP | 2006039786 A | 2/2006 |
| JP | 2008069702 A | 3/2008 |
| JP | 2009133451 A | 6/2009 |
| JP | 2010024871 A | 2/2010 |
| JP | 5065809 B2 | 11/2012 |
| WO | 2013111577 A1 | 8/2013 |

* cited by examiner

STEAM USING FACILITY MANAGEMENT METHOD, AND STEAM USING FACILITY

CROSS-REFERENCE TO RELATED APPLICATIONS

This application is the United States national phase of International Application No. PCT/JP2015/070574 filed Jul. 17, 2015, and claims priority to Japanese Patent Application No. 2014-158753 filed Aug. 4, 2014, the disclosures of which are hereby incorporated in their entirety by reference.

TECHNICAL FIELD

The present invention relates to a steam using facility management method and also to a steam using facility implementing the management method.

BACKGROUND ART

For operating a steam using facility in a favorable manner, it is necessary to maintain appropriately a balance between a generation amount and a consumption amount of steam in the steam using facility and also to discharge appropriately condensate generated due to e.g. consumption of steam to the outside of the facility. For example, when a generated steam amount of a steam generator decreases or a consumed steam amount in the steam using facility increases, a trouble will occur in the operation of the steam using facility due to shortage of steam. Also, when a generated condensate amount increases, this generated condensate amount may exceed a condensate discharging capacity of a steam trap, which will lead to accumulation of condensate within the steam using facility. As a result, heat transfer may be hindered, whereby pipe corrosion or water hammer may occur. The balance between the generated steam amount and the consumed steam amount in a steam using facility and the generated condensate amount associated with steam consumption vary depending on operational states of the respective devices (whether the devices are normal or operating or not or the generated steam amount and steam use amount of each device, etc.). So, in management of a steam using facility, it is necessary to cope with a change in the balance between the generated steam amount and the consumed steam amount and generated condensate amount in the steam using facility.

And, for instance, Patent Document 1 proposes a method according to which information such as generated steam amounts of various steam generating devices, consumed steam amounts of various steam using devices and condensate discharging methods are grasped and based on these information, a technique for improving the facility is searched. Based on the searched technique, the steam generation amounts and consumption amounts of the respective devices are adjusted and the condensate discharging method is improved, whereby it is possible to cope with change that occurs in the balance between the generated steam amount and the consumed steam amount and the generated condensate amount.

PRIOR ART DOCUMENT

Patent Document

Patent Document 1: Japanese Patent No. 5065809

SUMMARY

Problem to be Solved by Invention

However, due to a certain cause, there may occur unexpected change in the generated steam amount, the consumed steam amount and the generated condensate amount. In such case, even if all of the respective devices constituting the steam using facility are normal, only with the adjustment of the generated steam amounts and consumed steam amounts of the respective devices and improvement of the condensate discharging method, this can sometimes fail to cope with the change in the generated steam amount, the consumed steam amount and generated condensate amount sufficiently. In particular, in the case of occurrence of generated steam amount decrease, consumed steam amount increase or generated condensation amount increase as described above, significant trouble will occur in the operation of the steam using facility. Therefore, at least generated steam amount decrease, consumed steam amount increase and generated condensation amount increase need to be foreseen in a reliable manner.

In view of the above-described situation, a principal object of the present invention is to manage a steam using facility appropriately through reliable anticipation of generated steam amount decrease, consumed steam amount increase and generated condensation amount increase.

Solution

According to a first characterizing feature of a steam using facility management method according to this disclosure:

A steam using facility management method comprising the steps of:

in a steam using facility in which a generated condensate amount changes in association with a change in an environmental state value, based on a correlation between the environmental state value and the generated condensate amount, setting an environmental state value when the generated condensate amount becomes a set alarm amount as an alarm state value; and issuing an alarm when an actual environmental state value measured by a measuring instrument changes in an increasing direction of the generated condensate amount to reach the set alarm state value.

The present inventors have found that changes occur in the generated steam amount, the consumed steam amount and the generated condensate amount due to change in environmental state values involving changes in heat discharge states of various sections of the steam using facility such as the weather, ambient temperature, humidity, etc. Namely, an operation of the steam using facility involves heat discharge from various sections such as a steam generator, a steam using device, a pipe, etc. And, the heat discharge states of these respective sections vary in accordance with values of environmental states such as weather, temperature (or ambient temperature of the device), humidity, etc. (for instance, a discharged heat amount from a pipe increases if the pipe becomes wet by influence of rain or the temperature is low). And, when the heat discharge state changes in association with change in the environmental state value, an operational efficiency of the steam generator or the steam using device will change, thus leading to change in the generated steam amount or consumed steam amount or the discharged heat amount from the pipe or the consumed steam amount of the steam using device, which leads to a change in the generated condensate amount.

On the other hand, according to the above-described configuration, with utilization of correlation between the environmental state value and the generated condensate value, an environmental state value when the generated condensate amount becomes a set alarm amount is set as an alarm state value; an actual environmental state value is measured by a measuring instrument; and an alarm is issued when an actual environmental state value changes to reach the set alarm state value. Therefore, increase of generated condensate amount can be anticipated in a reliable manner.

And, with the anticipation of generated condensate amount increase, it is possible to cope with the generated condensate amount increase speedily. As a result, it becomes possible to speedily cope with various problems associated with generated condensate amount increase such as hindrance of heat transfer, pipe corrosion, occurrence of water hammer, etc.

According to one aspect, a steam using facility implementing the above-described steam using facility management method preferably comprises an alarm device for issuing an alarm when an actual environmental state value measured by the measuring instrument changes in an increasing direction of the generated condensate amount to reach the set alarm state value.

Namely, according to the above-described configuration, the steam using facility management method of the first aspect described above can be implemented in a favorable manner. With this, the above-described advantageous function/effect obtained by the steam using facility management method of the first aspect described above can be obtained effectively.

Further, according to a second aspect of the steam using facility management method relating to this disclosure:

A steam using facility management method comprising the steps of:

in a steam using facility in which a generated steam amount changes in association with a change in an environmental state value, based on a correlation between the environmental state value and the generated steam amount, setting an environmental state value when the generated steam amount becomes a set alarm amount as an alarm state value; and issuing an alarm when an actual environmental state value measured by a measuring instrument changes in a decreasing direction of the generated steam amount to reach the set alarm state value.

Namely, according to the above-described configuration, based on the above-described finding that a generated steam amount changes in association with a change in an environmental state value, with utilization of the correlation between the environmental state value and the generated steam amount, an environmental state value when a generated steam amount becomes a set alarm amount is set as an alarm state value. Also, an actual environmental state value is measured by a measuring instrument and an alarm is issued when the actual environmental state value reaches the alarm state value. Therefore, decrease of generated steam amount can be anticipated in a reliable manner.

And, with the anticipation of generated steam amount decrease, it is possible to cope with the generated steam amount decrease speedily. As a result, it becomes possible to speedily cope with various problems in the operation of steam using facility due to steam shortage.

According to one aspect, a steam using facility implementing the above-described steam using facility management method preferably comprises an alarm device for issuing an alarm when an actual environmental state value measured by the measuring instrument changes in a decreasing direction of the generated steam amount to reach the set alarm state value.

Namely, according to the above-described configuration, the steam using facility management method of the second aspect described above can be implemented in a favorable manner. With this, the above-described advantageous function/effect obtained by the steam using facility management method of the second aspect described above can be obtained effectively.

Further, according to a third aspect of the steam using facility management method relating to this disclosure:

A steam using facility management method comprising the steps of:

in a steam using facility in which a consumed steam amount changes in association with a change in an environmental state value, based on a correlation between the environmental state value and the consumed steam amount, setting an environmental state value when the consumed steam amount becomes a set alarm amount as an alarm state value; and issuing an alarm when an actual environmental state value measured by a measuring instrument changes in an increasing direction of the consumed steam amount to reach the set alarm state value.

Namely, according to the above-described configuration, based on the above-described finding that a consumed steam amount changes in association with a change in an environmental state value, with utilization of the correlation between the environmental state value and the consumed steam amount, an environmental state value when a consumed steam amount becomes a set alarm amount is set as an alarm state value. Also, an actual environmental state value is measured by a measuring instrument and an alarm is issued when the actual environmental state value reaches the alarm state value. Therefore, increase of consumed steam amount can be anticipated in a reliable manner.

And, with the anticipation of consumed steam amount increase, it is possible to cope with the consumed steam amount increase speedily. As a result, it becomes possible to speedily cope with various problems in the operation of steam using facility due to steam shortage.

According to one aspect, a steam using facility implementing the above-described steam using facility management method preferably comprises an alarm device for issuing an alarm when an actual environmental state value measured by a measuring instrument changes in an increasing direction of the consumed steam amount to reach the set alarm state value.

Namely, according to the above-described configuration, the steam using facility management method of the third aspect described above can be implemented in a favorable manner. With this, the above-described advantageous function/effect obtained by the steam using facility management method of the third aspect described above can be obtained effectively.

Further, in the steam using facility of the first through third aspects described above, preferably, the facility comprises:

a detector for detecting an operational state value of a monitoring target device; and a determining device for determining whether the monitoring target device is defective or not, the determining device being configured to correct a determination standard of defect of the monitoring target device, based on an environmental state value measured by the measuring instrument.

Namely, if a change occurs in the generated steam amount, the consumed steam amount or the generated condensate amount due to a change in the environmental state value, this will cause a certain effect on an operational state value of respective devices constituting the steam using facility. For instance, if the consumed steam amount or generated condensate amount increases due to a change in the environmental state value, this will cause increase in the load applied to the steam using device consuming steam, so it is believed that a change will occur also in the operational state value (e.g. temperature, vibration or rotational speed or consumed electric power amount of a motor or a turbine). In this way, in case a change occurs in an operational state value of a monitoring target device due to a change in the environmental state value, the operational state value after occurrence of the change may exceed a determination standard of the determining device although no defect is actually present in the monitoring target device, whereby the determining device may erroneously determine the monitoring target device being defective.

On the other hand, according to the above-described configuration, since the determination standard for determination of defect in a monitoring target device is corrected in accordance with a measured environmental state value, such erroneous determination by the determining device based on a change in an environmental state value can be effectively avoided.

EMBODIMENT

Figure 1:
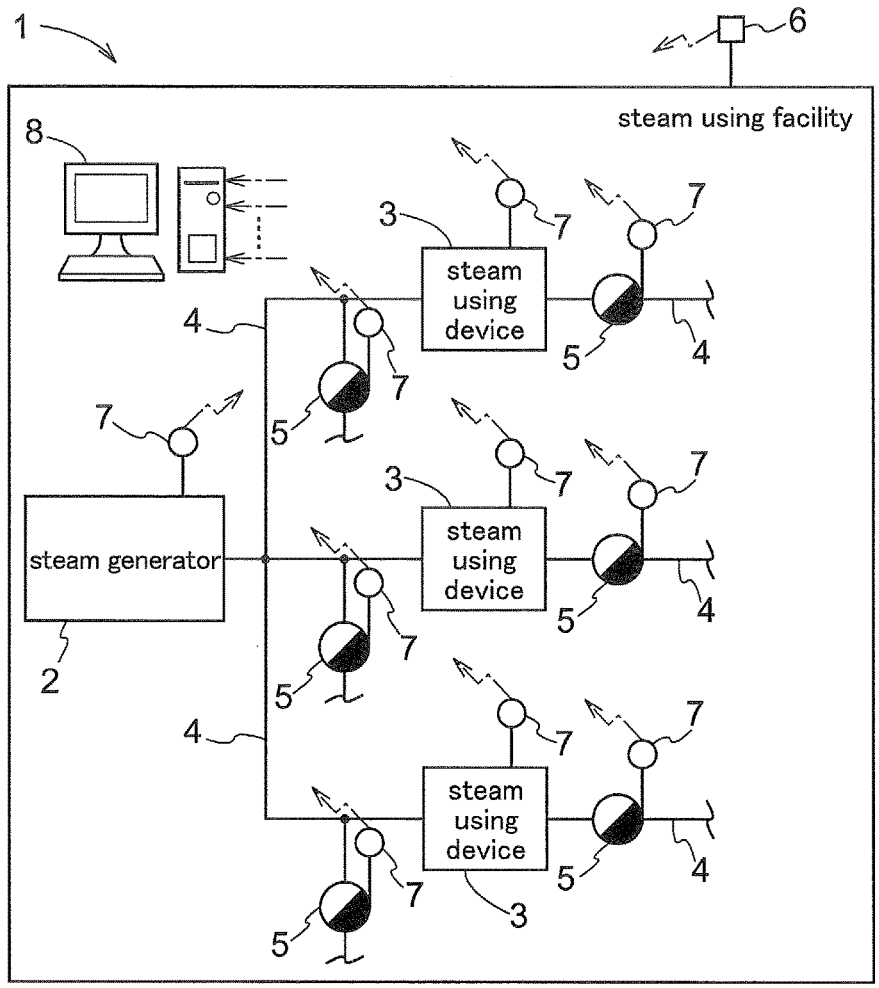
[FIG. 1] is a schematic plane view showing a steam using facility and its management system.

FIG. 1 shows a steam using facility and a management system for implementing a management method of a steam using facility according to this disclosure. In FIG. 1, a steam using facility 1 to which the inventive management system is applied includes a steam generator 2 such as a boiler, steam using devices 3 such as a turbine, a heat exchanger, etc., steam pipes 4 connected to the steam generator 2 or the steam using device 3, and steam traps 5 mounted in the steam pipes 4. With this steam using facility 1 in operation, steam is generated by the steam generator 2 and steam fed via the steam pipes 4 is used by the steam using devices 3 and condensates generated in the steam using devices 3 or the steam pipes 4 are collected by the steam traps 5.

This management system includes a measuring instrument 6 for measuring an environmental state value (e), detectors 7 for detecting operational state values (o) of the steam generator 2, the steam using devices 3 and the steam traps 5 as "monitoring target devices", and a central management device 8 (corresponding to an alarming device and a determining device) for effecting various determinations and alarming based on the environmental state value (e) or the operational state values (o).

The measuring instrument 6 measures information relating to the weather (sunshine, rain, etc.) and temperature. In order to measure these environmental state values (e), the measuring instrument 6 is disposed at a location suitable for measurement of the respective environmental state value (e), for instance, at an outdoor position outside the steam using facility 1, as shown in FIG. 1. Further, the measuring instrument 6 is configured to be capable of transmitting a measured environmental state value (e) to the central management device 8 via communication. Incidentally, the determination of weather-related information of the measuring instrument 6 includes measurement of an atmospheric pressure and determination of weather based thereon, and acquisition of various weather-relating information by e.g. making access to a database of a meteorological agency, etc. Here, the language "environmental state value" means a parameter involving a change in a heat discharge state of various sections of the steam using facility such as weather, ambient temperature, humidity, etc. It is not particularly limited, but can be any parameter whose change involves a change in a heat discharge state of various sections of the steam using facility.

The detector 7 detects, as the operational state value (o), a temperature of the device, ultrasonic vibration or sound generated from the device, a pressure or flow rate of steam passing through the device, a consumed electric power amount of the device, etc., depending on the monitoring target device. In order to be able to measure these operational state values (o), the detectors 7 are disposed directly or indirectly relative to the respective devices. Further, the detectors 7 are configured also to be able to transmit the detected operational state values (o) to the central management device 8 by communication.

Figure 2:
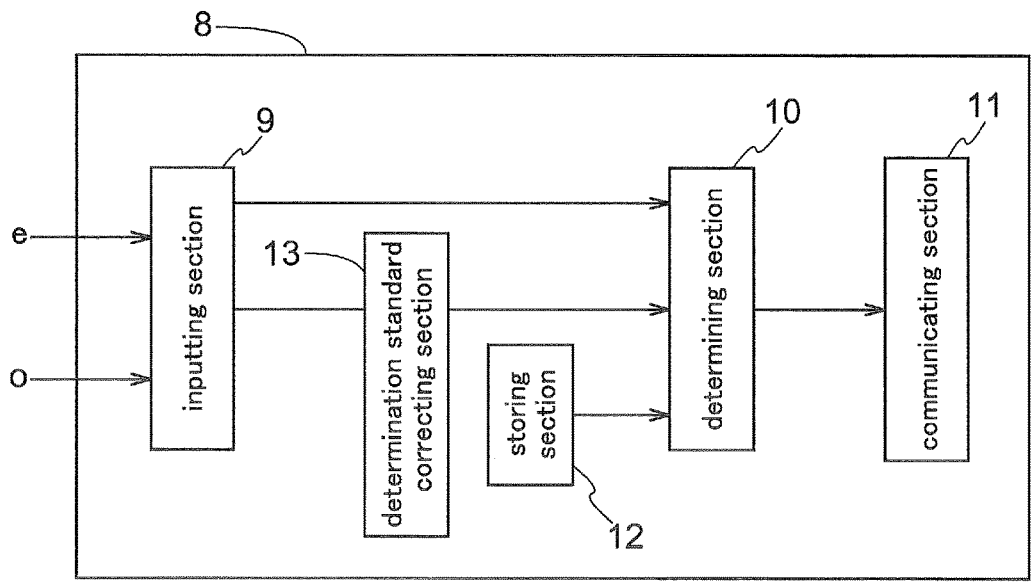
[FIG. 2] is a block diagram showing a configuration of a central management device.

The central management device 8, as shown in FIG. 2, includes an inputting section 9 for obtaining the environmental state values (e) or the operational state values (o), a determining section 10 for effecting a predetermined determination based on obtained environmental state value or operational state value, a communicating section 11 for issuing alarm in accordance with determination result, a storing section 12 for storing e.g. various determination standards used in the determining section 10, and a determination standard correcting section 13 for correcting the determination standards in the determining section 10 based on acquired environmental state value.

In general, in accordance with a change in the environmental state value (e) such as weather, ambient temperature, humidity, air flow amount, etc., in an operation of the steam using facility 1, a change occurs in a heat discharge state from its respective sections such as the steam generator 2, the steam using devices 3, the steam pipes 4, etc., (for instance, when the pipe 4 is wetted by influence of rain or the ambient temperature of the pipe 4 drops, a discharged heat amount from the pipe 4 will increase). And, when the heat discharge state changes, this will cause such situations as dropping of operational efficiency of the steam generator 2 or the steam using devices 3 or increase of the discharged heat amount from the pipes 4. With this, there occurs reduction in the generated steam amount of the steam generator 2, increase of consumed steam amount of the heat using devices 3, or increase of generated condensate amount of the heat using devices 3 or the steam pipes 4. Then, a trouble can develop in the operation of the steam using facility 1 due to steam shortage resulting from decrease of generated steam amount, or increase of consumed steam amount. Or, due to the increase of generated condensate amount, heat transfer may be hindered, whereby pipe corrosion or water hammer may occur.

Then, according to this central management device 8, set alarm amounts that may invite some inconvenience in the steam using facility 1 are set respectively for the generated condensate amount, the generated steam amount and the consumed steam amount. And, in the storing section 12, in a correlation between an environmental state value (e) and a generated condensate amount in a steam using facility 11 in which a generated condensate amount changes in association with a change in the environmental state value (e), an environmental state value (e) when the generated condensate amount changes in the increasing direction to reach the set alarm amount over the condensate discharging capacity of the steam trap is stored as a first alarm state value. Further, in a correlation between an environmental state value (e) and a generated steam amount in a steam using facility 1 in which a generated steam amount changes in association with a change in the environmental state value (e), an environmental state value (e) when the generated steam amount changes in the decreasing direction to reach the set alarm amount that causes a trouble in an operation of the steam using facility due to steam shortage is stored as a second alarm state value. Moreover, in a correlation between an environmental state value (e) and a consumed steam amount in a steam using facility 1 in which a consumed steam amount changes in association with a change in the environmental state value (e), an environmental state value (e) when the consumed steam amount changes in the increasing direction to reach the set alarm amount that causes a trouble in an operation of the steam using facility due to steam shortage is stored as a third alarm state value.

And, the determining section 10 determines, respectively, whether the environmental state value (e) acquired by the inputting section 9 has reached the first alarm state value due to change of the generated condensate amount in the increasing direction or not, or the second alarm state value due to change of the generated steam amount in the decreasing direction or not, or the third alarm state value due to change of the consumed steam amount in the increasing direction or not.

In the determining section 10, it is arranged such that the respective determination is made based a value standardized into a single value with weighting of each acquired environmental state value (e). And, the first through third alarm state values are set as values when the generated condensate amount, the generated steam amount and the consumed steam amount reach the respectively set alarm amount, in connection with such standardized environmental state value (e) above.

As an alternative technique, the first through third alarm state values may be set for each environmental state value (e) (namely, the first through third alarm state values are set for the weather-related information, and temperature, respectively), so that comparison is made between each environmental state value (e) acquired by the determining section 10 and the first through third alarm state value corresponding thereto.

Moreover, if the determining section 10 determines that an acquired environmental value (e) has reached any one of the first through third alarm state values, the communicating section 11 issues an alarm to the effect that the environmental state value (e) has reached one of the first through third alarm state values. For instance, to an alarm (not shown, corresponding to an "alarming device"), an instruction is communicated to cause the device to issue an alarm of the environmental state value (e) having reached one of the first through third alarm state values. Or, to a managing person of the steam using facility 1 or a computer or a mobile phone used or carried by the managing person, this information of which one of the first through third alarm state values the environmental state value (e) has reached or information of how to cope with the situation will be transmitted.

With the above, it becomes possible to speedily cope with the above-described various problems related to the increase of generated condensate amount, decrease of generated steam amount and increase of consumed steam amount.

Further, the determining section 10 compares each acquired environmental state value (o) with a determination standard set for each operational state value (o) stored in the storing section 12, thus determining whether a monitoring target device is defective or not.

If a change occurs in the generated steam amount, the consumed steam amount or the generated condensate amount due to a change in the environmental state value (e), this will cause a certain effect on an operational state value (o) of respective devices constituting the steam using facility 1. For instance, if the consumed steam amount or generated condensate amount increases due to a change in the environmental state value (e), this will cause increase in the load applied to the steam using device 3 consuming steam, so it is believed that a change will occur also in the operational state value (e.g. temperature, vibration or rotational speed or consumed electric power amount of a motor or a turbine). In this way, in case a change occurs in an operational state value (o) of a monitoring target device due to a change in the environmental state value (e), the operational state value (o) after occurrence of the change may exceed a determination standard although no defect is actually present in the monitoring target device, whereby the determining section 10 may erroneously determine the monitoring target device being defective.

Then, according to the central management device 8 acting as a determining device, based on an acquired environmental state value (e), the standard for use in the determination is corrected by the determination standard correcting section 13. And, based on thus corrected determination standard, the determining section 10 determines whether the monitoring target device is defective or not. With this, such erroneous determination by the determining device based on a change in an environmental state value (e) can be effectively avoided.

With using the management system described above, the environmental state values (e) and the operational state values (o) of the respective devices of the steam using facility 1 are periodically or constantly acquired from the detectors 7 and based on these environmental state values (e) and the operational state values (o), the steam using facility 1 is managed.

Conventionally, the operational state values (o) of the respective devices of the steam using facility 1 would be periodically or constantly acquired from the detectors 7 and based on these operational state values (o), changes in e.g. the generated steam amount, the consumed steam amount and the generated condensate amount, etc. would be anticipated, thereby to manage the steam using facility 1. Whereas, according to the steam using facility management method according to this disclosure, not only the operational state values (o) of the respective devices of the steam using facility 1 are obtained from the detectors 7, but also the environmental state value (e) is acquired by the measuring instrument 6. And, based on a change occurring in this environmental state value (e), changes in the generated steam amount, the consumed steam amount and generated condensate amount are perceived, and moreover, the determination standard for the operational state value (o) used for determination of whether each device is defective or not is corrected. Therefore, erroneous determination relating to defect of each device based on a change in an environmental state value can be effectively avoided.

Other Embodiments

In the foregoing embodiment, the measuring instrument 6 is disposed outdoors on the outside of the steam using facility 1 so as to measure weather-relating information and temperature as the environmental state values (e). The disclosure is not limited thereto. Instead, for instance, the disposing position can be appropriately set as needed such as an indoor position inside the steam using facility 1. Further, the instrument 6 can be configured to measure various values as needed such as an ambient temperature, humidity and air flow amount of each device, etc. In case an ambient temperature of each device is to be measured, the measuring instrument 6 may be disposed in the periphery of the respective device. And, the measuring instrument 6 can be integrated with the detector 7.

In the foregoing embodiment, the storing section 12 stores an environmental state value (e) when the generated condensate amount changes in the increasing direction to reach the set alarm amount as the first alarm state value, stores an environmental state value (e) when the generated steam amount changes in the decreasing direction to reach the set alarm amount as the second alarm state value, and stores an environmental state value (e) when the consumed steam amount changes in the increasing direction to reach the set alarm amount as the third alarm state value. The arrangement is not limited thereto, the storing section 12 may be configured to store, as further alarm state values, an environmental state value (e) when the generated condensate amount changes in the decreasing direction to reach a set alarm amount, an environmental state value (e) when the generated steam amount changes in the increasing direction to reach a set alarm amount and/or an environmental state value (e) when the consumed steam amount changes in the decreasing direction to reach a set alarm amount. In this case, the determining section 10 may be configured to determine whether an environmental state value (e) acquired by the inputting section 9 has reached the alarm state value due to change of the generated condensate amount in the decreasing direction or change in the generated steam amount in the increasing direction or due to a change in the consumed steam amount in the decreasing direction.

In the foregoing embodiment, there was disclosed an arrangement in which the detectors 7 detect the operational state values (o) of the steam generator 2, the steam using devices 3 and the steam traps 5 as "monitoring target devices". However, the disclosure is not limited thereto. Operational state values (o) of other devices such as valves may be detected. Further, the detection of the operational state value (o) may be limited to a specified instrument such as a steam trap(s) 5.

INDUSTRIAL APPLICABILITY

The steam using facility management method and the steam using facility implementing the steam using facility management method according to this disclosure may be applied to management of various plants or factories of various fields, etc.

DESCRIPTION OF REFERENCE MARKS/NUMERALS

1: steam using facility
2: steam generator (monitoring target device)
3: steam using device (monitoring target device)
5: steam trap (monitoring target device)
6: measuring instrument
7: detector
8: alarming device, determining device (central management device)
e: environmental state value
o: operational state value

The invention claimed is:

1. A computer-implemented steam using facility management method comprising:
   in a steam using facility in which a generated condensate amount, a generated steam amount, or a consumed steam amount changes in association with a change in an environmental state value, and a heat discharge state of various sections of the steam using facility vary in accordance with the environmental state value causing a change in an operational state value of a monitoring target device measured by a detector of the monitoring target device, based on a correlation between the environmental state value and the generated condensate amount, the generated steam amount, or the consumed steam amount:
   (i) setting the environmental state value, when the generated condensate amount becomes a first set alarm amount over a condensate discharging capacity of a steam trap, as a first alarm state value,
   (ii) setting the environmental state value, when the generated steam amount becomes a second set alarm amount that causes a trouble in an operation of the steam using facility due to a steam shortage, as a second alarm state value, or
   (iii) setting the environmental state value, when the consumed steam amount becomes a third set alarm amount that causes the trouble in the operation of the steam using facility due to the steam shortage, as a third alarm state value;
   determining that an actual environmental state value measured by a measuring instrument changes in an increasing direction of the generated condensate amount to reach the first alarm state value, changes in a decreasing direction of the generated steam amount to reach the second alarm state value, or changes in an increasing direction of the consumed steam amount to reach the third alarm state value; and
   issuing an alarm in response to the determination that the actual environmental state value measured by the measuring instrument changes in the increasing direction of the generated condensate amount to reach the first alarm state value, changes in the decreasing direction of the generated steam amount to reach the second alarm state value, or changes in the increasing direction of the consumed steam amount to reach the third alarm state value.

2. The computer-implemented steam using facility management method of claim 1, further comprising:
   detecting an operational state value of a monitoring target device in the steam using facility;
   correcting, based on the actual environmental state value measured by the measuring instrument, a determination standard of defect set for the operational state value of the monitoring target device; and
   determining, based on the operational state value and the corrected determination standard of defect set for the operational state value of the monitoring target device, whether the monitoring target device is defective is due to a defect in the monitoring target device or not defective and being effected by the change in the environmental state value.

3. The computer-implemented steam using facility management method of claim 1, further comprising:
constantly measuring, with the measuring instrument, the actual environmental state value.

4. The computer-implemented steam using facility management method of claim 1, further comprising:
electronically communicating an instruction for issuing the alarm to an alarm device.

5. The computer-implemented steam using facility management method of claim 1, wherein the monitoring target device includes at least one of a steam using device and a steam trap of the steam using facility, wherein the environmental state value includes information relating to at least one of: weather associated with the steam using facility, an ambient temperature associated with the steam using facility, and a humidity associated with the steam using facility, and wherein the operational state value includes at least one of: a temperature of the monitoring target device, an ultrasonic vibration or sound generated from the monitoring target device, a pressure or flow rate of steam passing through the monitoring target device, a consumed electric power amount of the monitoring target device, or any combination thereof.

6. A system comprising:
a measuring instrument configured to measure an environmental state value;
a detector configured to detect an operational state of a monitoring target device in a steam using facility, wherein a heat discharge state of various sections of the steam using facility vary in accordance with the environmental state value causing a change in the operational state value of the monitoring target device measured by the detector of the monitoring target device; and
a central management device for the steam using facility is programmed and/or configured to:
based on a correlation between the environmental state value and a generated condensate amount, a generated steam amount, or a consumed steam amount:
(i) set the environmental state value, when the generated condensate amount becomes a first set alarm amount over a condensate discharging capacity of a steam trap in the steam using facility, as a first alarm state value,
(ii) set the environmental state value, when the generated steam amount becomes a second set alarm amount that causes a trouble in an operation of the steam using facility due to a steam shortage, as a second alarm state value, or
(iii) set the environmental state value, when the consumed steam amount becomes a third set alarm amount that causes the trouble in the operation of the steam using facility due to the steam shortage, as a third alarm state value,
wherein in the steam using facility in which the generated condensate amount, the generated steam amount, or the consumed steam amount changes in association with a change in the environmental state value;
determine that an actual environmental state value measured by the measuring instrument changes in an increasing direction of the generated condensate amount to reach the first alarm state value, changes in a decreasing direction of the generated steam amount to reach the second alarm state value, or changes in an increasing direction of the consumed steam amount to reach the third alarm state value; and
control issuing of an alarm in response to the determination that the actual environmental state value measured by the measuring instrument changes in the increasing direction of the generated condensate amount to reach the first alarm state value, changes in the decreasing direction of the generated steam amount to reach the second alarm state value, or changes in the increasing direction of the consumed steam amount to reach the third alarm state value.

7. The system of claim 6, wherein the measuring instrument constantly measures the actual environmental state value.

8. The system of claim 6, further comprising:
an alarm device for issuing the alarm, wherein the central management device for the steam using facility is programmed and/or configured to electronically communicate an instruction for issuing the alarm to the alarm device.

9. The system of claim 6, further comprising:
a detector for detecting an operational state value of a monitoring target device in the steam using facility; and
wherein the central management device for the steam using facility is programmed and/or configured to:
correct, based on the actual environmental state value measured by the measuring instrument, a determination standard of defect set for the operational state value of the monitoring target device; and
determine, based on the operational state value and the corrected determination standard of defect set for the operational state value of the monitoring target device, whether the monitoring target device is defective is due to a defect in the monitoring target device or not defective and being effected by the change in the environmental state value.

10. The system of claim 6, wherein the monitoring target device includes at least one of a steam using device and a steam trap of the steam using facility, wherein the environmental state value includes information relating to at least one of: weather associated with the steam using facility, an ambient temperature associated with the steam using facility, and a humidity associated with the steam using facility, and wherein the operational state value includes at least one of: a temperature of the monitoring target device, an ultrasonic vibration or sound generated from the monitoring target device, a pressure or flow rate of steam passing through the monitoring target device, a consumed electric power amount of the monitoring target device, or any combination thereof.

* * * * *